(12) United States Patent
Fils

(10) Patent No.: US 8,578,081 B1
(45) Date of Patent: *Nov. 5, 2013

(54) DOCKING STATION FOR AN ELECTRONIC DEVICE

(76) Inventor: Robert Louis Fils, Los Gatos, CA (US)

( * ) Notice: Subject to any disclaimer, the term of this patent is extended or adjusted under 35 U.S.C. 154(b) by 74 days.

This patent is subject to a terminal disclaimer.

(21) Appl. No.: 12/915,967

(22) Filed: Oct. 29, 2010

Related U.S. Application Data

(63) Continuation-in-part of application No. 11/881,178, filed on Jul. 25, 2007, now Pat. No. 7,831,756.

(51) Int. Cl.
| | | |
|---|---|---|
| *G06F 13/00* | (2006.01) | |
| *G06F 13/38* | (2006.01) | |
| *G04B 1/00* | (2006.01) | |
| *G04B 1/08* | (2006.01) | |

(52) U.S. Cl.
USPC ............... 710/303; 710/72; 381/86; 455/348

(58) Field of Classification Search
USPC .................. 710/303, 72; 381/86; 455/348
See application file for complete search history.

(56) References Cited

U.S. PATENT DOCUMENTS

| | | | | |
|---|---|---|---|---|
| 5,924,782 | A * | 7/1999 | Park ............................... | 312/328 |
| 6,595,608 | B1 * | 7/2003 | Minelli et al. ................. | 312/296 |
| 6,934,568 | B2 | 8/2005 | Charlier et al. | |
| 6,939,155 | B2 | 9/2005 | Postrel | |
| 7,263,032 | B2 | 8/2007 | Polany et al. | |
| 7,324,833 | B2 | 1/2008 | White et al. | |
| 7,347,736 | B2 | 3/2008 | Ni | |
| 7,443,660 | B2 * | 10/2008 | Mayuzumi ............... | 361/679.55 |
| 7,634,228 | B2 | 12/2009 | White et al. | |
| 7,778,595 | B2 | 8/2010 | White et al. | |
| 7,831,756 | B1 * | 11/2010 | Fils ................................ | 710/303 |
| 8,223,997 | B2 * | 7/2012 | Wilson et al. ................. | 381/189 |
| 2002/0077834 | A1 * | 6/2002 | Estevez .......................... | 704/503 |
| 2007/0081303 | A1 * | 4/2007 | Lam et al. ...................... | 361/679 |
| 2007/0087725 | A1 * | 4/2007 | Anderson ...................... | 455/348 |
| 2008/0095382 | A1 | 4/2008 | Mott et al. | |
| 2009/0017884 | A1 * | 1/2009 | Rotschild .................... | 455/575.8 |
| 2010/0246113 | A1 * | 9/2010 | Visser et al. ............... | 361/679.3 |
| 2012/0255092 | A1 * | 10/2012 | Wilson et al. .................... | 2/2.15 |

OTHER PUBLICATIONS

"Mobipod Series Model Specification," Car Head Unit (DIN Size).
Data Sheet for AQ-CD-1, CD Media Control Center, Aquatic AV, Campbell, CA, Feb. 2005.
Data Sheet for AQ-DVD-1, DVD Media Control Center, Aquatic AV, Campbell, CA, Feb. 2005.

* cited by examiner

*Primary Examiner* — Paul R Myers
*Assistant Examiner* — Christopher a Daley
(74) *Attorney, Agent, or Firm* — Haverstock & Owens

(57) ABSTRACT

The present invention is directed to a housing unit, which allows an electronic device such as a portable digital audio player to be substantially hermetically sealed within an audio device. The electronic device is controllable by a user while housed with the housing unit. The audio device is able to be used in a vehicle such as a car, a camper, or a boat or in other common consumer products.

68 Claims, 13 Drawing Sheets

DOCKING STATION FOR AN ELECTRONIC DEVICE

RELATED APPLICATIONS

This patent application is a continuation-in-part of the co-pending U.S. patent application Ser. No. 11/881,178, filed Jul. 25, 2007, entitled "DOCKING STATION FOR AN ELECTRONIC DEVICE." U.S. patent application Ser. No. 11/881,178 is hereby incorporated by reference.

FIELD OF THE INVENTION

The present invention is related to a docking station. More particularly, the present invention is related to a docking station for connecting an electronic device such as a portable digital audio player to an audio system in a vehicle such as a car, a camper, or a boat.

BACKGROUND OF THE INVENTION

Portable digital media players allow consumers to carry their music and other media with them wherever they go. Devices such as the iPod™ are rapidly gaining popularity. It is also desirable to connect these portable digital audio players to audio systems in vehicles such as cars, campers, or boats. Such a connection will allow music to be played through the speakers for multiple persons to enjoy, rather than through the headphones for one person to hear.

Currently, there are two main options for connecting a portable digital audio player to an audio system in a car, a camper, a boat or other vehicles. Using the first option, a portable digital audio player is connected to the vehicle audio system via a cassette adapter. A cassette-shaped interface on one end of the adapter inserts into the vehicle audio system's tape deck. A mini-plug on the other end of the adapter inserts into the portable digital audio player's headphone jack. This connection allows the portable digital audio player to connect to the vehicle audio system through the in-dash cassette player. However, this option is problematic. First, the ease in which the connections are able to disconnect forces a user to carefully organize the tangle of cords required to connect the device to the tape player. Next, using this connection degrades the sound coming out of the device since it must be transferred from the device to the tape cassette and then from the cassette to the stereo.

A second option involves connecting a portable digital audio player to the vehicle audio system via a wireless FM transmitter, which allows the portable digital audio player's music to play wirelessly through any FM radio. This connection is also lossy and is subject to normal radio transmission problems such as difficulty in tuning and the inability to receive transmission in certain locations.

Both options require finding placement for the portable digital audio player somewhere in the vehicle, separate from the vehicle audio system. The second option also requires finding placement for the transmitter itself. In vehicles such as cars, campers, or boats, space is at a premium and it is difficult to find space to secure the portable digital audio player and/or the transmitter such that it would not fall or move about as the vehicle is moving. In addition, in a boat, audio systems are often made to be waterproof. The current methods of connecting a portable digital audio player to a vehicle audio system would not give it any protection from the elements, thus making water, dust, and other damage to the portable digital audio player more likely.

As described, once connected the portable digital media player typically plays through an external device such as a tape player and/or the speakers of an existing audio system. The existing audio system usually comprises an interface at the front for controlling the device and a rear chassis housing remaining circuitry. However, because of the size and configuration of the front interface and the rear chassis when the audio system is mounted to a surface, the front interface faces outward toward a user while the rear chassis extends through and into the surface. Consequently, the device is only able to be mounted onto a surface with a large enough cavity or rear space with which to accommodate the device. Accordingly, connection of the portable digital media player is limited to those instances where there is enough space to accommodate the user interface and rear chassis of an external audio system.

SUMMARY OF THE INVENTION

The present invention is directed to a docking station, which allows an electronic device such as a portable digital audio player to be secured and protected from the elements while connected to an audio system of a vehicle such as a car, a camper, or a boat; or connected to an audio system in other consumer products. The docking station is enclosed within a housing unit such that when the electronic coupling on the electronic device is coupled to the corresponding electronic coupling in the docking station, the body of the electronic device is enclosed entirely within the housing unit. A cover then seals to the housing unit to define a waterproof and dust proof enclosure for the electronic device. In some embodiments of the present invention, the housing unit comprises an enclosure to securely hold the electronic device within the housing unit. In some embodiments of the present invention, the cover includes controls for controlling the audio system, including the now connected and enclosed portable digital audio player. In some embodiments of the present invention, the electronic device is controllable with a remote control. In some embodiments, the housing unit further comprises an enclosure having a unique geometry to securely hold the remote control as well as the electronic device.

Further, the invention comprises a housing unit containing a docking station for coupling to an electronic device such as a portable digital audio player. Once the electronic device is securely docked, the cover is able to be moved to a closed position, thus coupling with the housing unit to define a waterproof enclosure for containing the electronic device. In some embodiments of the present invention, an audio system control panel is located on the cover. The cover is able to connect to the housing unit in various ways. In one embodiment, the cover is connected to the bottom of the housing unit such that it must be flipped upwards to the closed position. In an alternative embodiments, the cover is connected to the top of the housing unit such that it flips downwards to the closed position or connected to the side of the housing unit and swings open and closed. In yet another alternative, the cover is completely detachable from the housing unit and must be snapped into place to the closed position. In some embodiments, when the cover is in the closed position, the portable digital audio player is connected and secured within the waterproof housing unit and protected from the elements.

In addition, the audio system and the docking station are connected to the vehicle's engine such that when the engine is turned off and the key removed, a series of beeps will sound to remind the owner that the electronic device is still connected and enclosed within the housing unit. This reminder system helps to prevent the owners from leaving the electronic device in the vehicle unintentionally.

In one aspect, a mountable housing for removably holding an electronic device comprises a cavity to accept the electronic device, a connector located within the cavity to couple with the electronic device and a cover coupled to the apparatus, wherein when the cover is in a closed position and the electronic device is in the cavity a front face of the electronic device faces a back of the cover. In some embodiments, the cover comprises a controller interface, wherein the controller interface couples to the housing unit to define the sealed enclosure, and wherein the controller interface comprises a user interface for controlling the electronic device when the electronic device is housed in the housing unit. In some embodiments, the housing is mounted on a flat surface. In some of these embodiments, the housing is removably mounted to the flat surface. In some embodiments, the housing further comprises a connector which connects to one or more of an amplifier and speakers. In some embodiments, the cavity is an electronic device specific form-fitting opening. In further embodiments, the opening accommodates a number of different sized electronic devices, and wherein the enclosure is an electronic device generic enclosure which accommodates a number of different sized electronic devices. In some embodiments, the connector is selected from among RCA cables, multi-pin connectors, 8P8C connectors, DE-9 connectors, USB connectors, and 30-pin connectors. In some embodiments, the housing further comprises a receiver for receiving wireless transmissions and a wireless remote with a transceiver, wherein the transceiver sends wireless information to the receiver, and wherein the wireless information controls the electronic device contained within the housing unit. In some of these embodiments, the receiver and transceiver utilize wireless transmission technologies selected from among IEEE 802.11 standard wireless technology, Bluetooth® wireless technology, Infra-red transmission technology, and Radio Frequency technology. In some embodiments, the cover is configured to allow the transmission of wireless transmission technologies therethrough. In some embodiments, the controller interface comprises controls coupled to a steering mechanism. In further embodiments, the controller interface further comprising a display screen. In some embodiments, the display screen displays video files selected from among DivX Media, MPEG-1, MPEG-2 and MPEG-4 video files. In further embodiments, the controller interface detachably couples with the housing.

In another aspect, an apparatus for housing and controlling a removable electronic device comprises a housing unit comprising an enclosure for holding the electronic device, a connector for coupling with the electronic device and a cover coupled to the apparatus, wherein a back of the housing unit is mounted flush with an exterior surface. In some embodiments, the cover comprises a user interface for controlling the electronic device when the electronic device is housed in the housing unit. In some embodiments, the apparatus removably mounts to the mountable surface. In some embodiments, the apparatus further comprises a connector which connects to one or more of an amplifier and speakers. In some embodiments, the enclosure is an electronic device specific form-fitting enclosure. In further embodiments, the enclosure accommodates a number of different sized electronic devices. In some embodiments, the connector is selected from among RCA cables, multi-pin connectors, 8P8C connectors, DE-9 connectors, USB connectors, and 30-pin connectors. In some embodiments, the user interface further comprises a receiver for receiving wireless transmissions, and a wireless remote control device with a transceiver, wherein the transceiver sends wireless information to the receiver to control the electronic device contained within the housing unit. In some embodiments, the receiver and transceiver utilize wireless transmission technologies selected from among IEEE 802.11 standard wireless technology, Bluetooth® wireless technology, Infra-red transmission technology, and Radio Frequency technology. In some embodiments, the user interface comprises controls coupled to a steering mechanism. In further embodiments, the user interface further comprises a display screen. In some of these embodiments, the display screen displays video files selected from among DivX Media, MPEG-1, MPEG-2 and MPEG-4 video files. In some embodiments, the user interface detachably couples from the housing unit.

In another aspect, a method of coupling a removable electronic device to an audio apparatus comprises coupling a removable electronic device within a housing unit, wherein a back of the electronic device is placed flat against a back of the housing unit and controlling the electronic device from outside the housing unit when the electronic device is sealed within the housing unit. In some embodiments, the method further comprises coupling a user interface to the housing unit. In further embodiments, the method comprises broadcasting signals from a remote control having a transceiver to the user interface, wherein the user interface is configured with a receiver for receiving wirelessly broadcasted signals. In some embodiments, the method the user interface is coupled to steering controls, and wherein the steering wheel controls are used to control the electronic device when the electronic device is sealed within the housing unit. In some embodiments, the method further comprises displaying video content from the electronic device on a display screen.

DETAILED DESCRIPTION OF THE INVENTION

Figure 1:
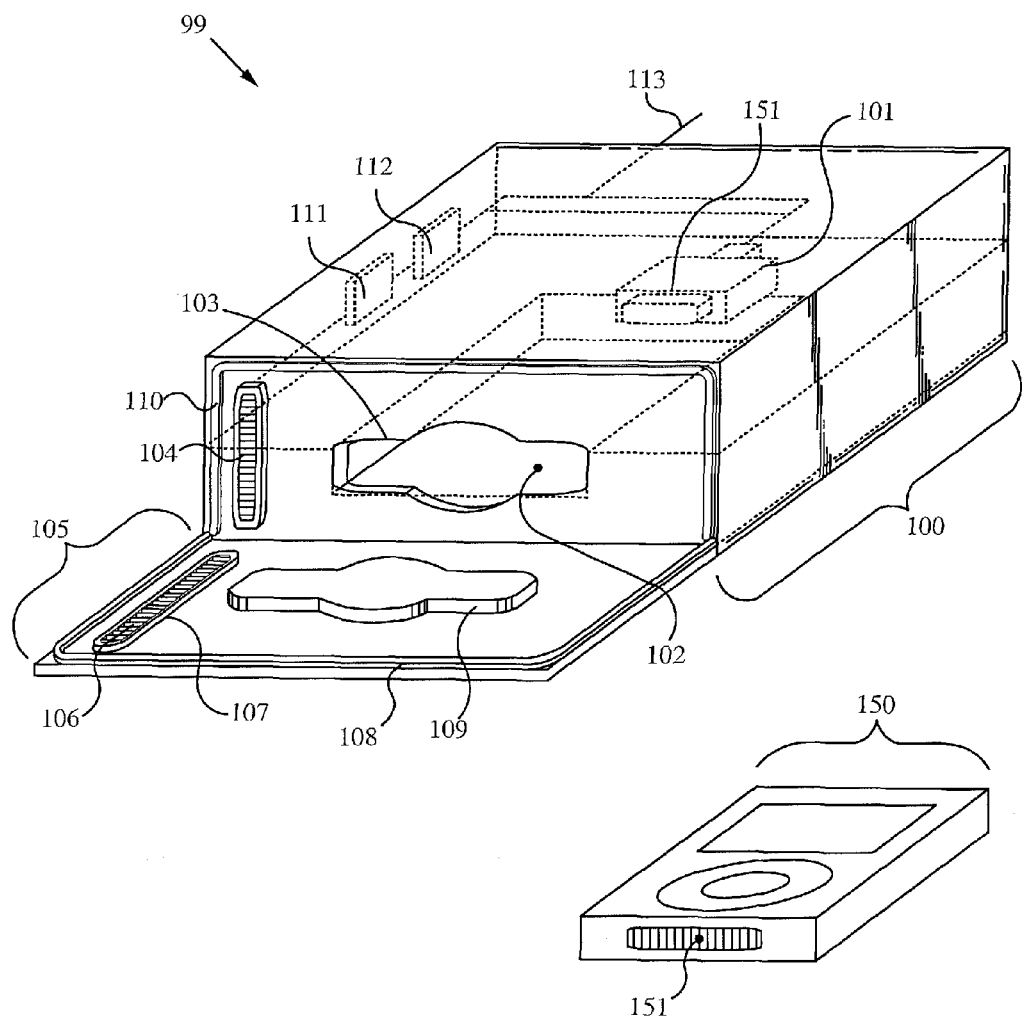
FIG. 1 illustrates a perspective view of an electronic device and housing unit according to some embodiments of the present invention.

FIG. 1 illustrates a perspective view of an electronic device 150 and a housing unit 100 with a form fitting cavity 102 and device-housing connector 101 for electronically coupling the electronic device 150 with the housing unit 100. In some embodiments of the present invention, the electronic device 150 is a portable digital media device such as an iPod™, Palm™, Zen™, Zune™, or other digital media devices, MP3 players and music phones. In other embodiments of the present invention, the electronic device 150 supports MP4 format or DivX Media Format devices. Alternatively, the electronic device 150 supports any appropriate audio or video recording and transmission format.

In some embodiments of the present invention, the housing unit 100 is part of an audio system 99 in a vehicle, such as for example a car, a camper, or a boat. In other embodiments of the present invention, the housing unit 100 is a stand alone audio device. In yet other embodiments of the present invention, the housing unit 100 is integrated into common consumer products, appliances or accouterments. Examples of other items in which the housing unit 100 is able to be integrated with include, but are not limited to: barbeque grills or other outdoor kitchen units; hot tubs; refrigerators; furniture; shower and bathroom appliances; bicycles; motorcycle or skiing helmets; backpacks or purses; among others.

A device-housing connector 101 couples with the electronic device connector 151. As shown, the device-housing connector 101 is the male end of connector and the electronic device 150 has a connector 151 which is the female counterpart to the device-housing connector 101. It will be readily apparent to those ordinarily skilled in the art that in alternative embodiments, the device connector 151 is the male end of a connector pairing and that the device-housing connector 101 is the female end of the connector pairing. It will also be apparent to those having ordinary skill in the art, that although the connectors 101 and 151 are shown having a particular geometry and pin layout, any connectors which electrically couple the device 150 with the housing 100 are equally envisioned. In some embodiments of the present invention the electronic coupling means are selected from among: RCA cables, multi-pin connectors, 8P8C connectors, DE-9 connectors, USB connectors, and 30-pin connectors, among others.

To couple the electronic device 150 to the housing unit 100, a user inserts the electronic device 150 through the form fitting opening 103 and completely into the form fitting cavity 102, resulting in the electronic device 150 being fitted entirely within the housing unit 100.

The control interface 105 is coupled to the housing unit 100. As shown, the control interface 105 is attached to the bottom edge of the housing unit 100 and the control interface 105 swings upward to couple with the top edge of the housing unit 100 to define an enclosure for containing the electronic device 150 within the housing device 100. It will be readily apparent to those ordinarily skilled in the art that the control interface 105 is able to couple to the housing unit in a wide variety of ways, including, but not limited to, flip down designs and detachable designs (discussed in FIGS. 4A & 4B below).

As shown, the control interface 105 is electronically coupled to the housing unit 100 through the interface connector 104 and the controller connector 106. A user interfaces the control interface via controls (not shown) on the face of the control interface 105. In some embodiments, the interface connector 104 is further coupled to the circuitry 111 of the housing unit 100, including the device-housing connector 101. In some embodiments of the present invention, the device housing connector 101 is coupled to additional circuitry 112 which allows particular electronic devices 150 to be played and controlled by the housing unit 100. In certain embodiments of the present invention, the additional circuitry 112 is programmed with media player device manufacturer-specific proprietary circuitry such as that needed to play the Apple® Accessory Protocol. Finally, the housing circuitry is coupled to the output 113. In some embodiments of the present invention, the output 113 is an audio/video output.

It is an object of the present invention that the connection between the housing unit 100 and the control interface 105 be substantially hermetic. As such, the control interface 105 possesses a number of sealing gaskets: the interface connector gasket 107, the control interface gasket 108 and the cavity interface gasket 109. The housing unit 100 has corresponding surface geometry, such as the raised nature of the interface connector 104 and the ridge 110, such that when the control interface 105 is coupled to the housing unit 100, the gasket features 107, 108 and 109 substantially hermetically seal the control interface 105 with the housing unit 100. In alternative embodiments of the present invention, the housing unit 100 contains gasket features and the control interface 105 possesses a unique geometry to substantially hermetically couple the two. Preferably, the sealing gaskets 107, 108 and 109 are comprised of a resilient material such as rubber.

In some embodiments of the present invention, the housing unit 100 is designed to accommodate a particular electronic device 150. The housing unit 100 as shown in FIG. 1 accomplishes this object of the invention by providing a form fitting cavity 102 (indicated by dashed lines) located within the housing unit 100 and a form fitting opening 103 allowing the electronic device 150 to be inserted into the cavity 102. Furthermore, the form fitting opening 103 also accommodates the cavity interface gasket 109 after the electronic device 150 is inserted into the cavity 102, creating a substantially hermetic seal around the cavity 102. Furthermore, upon coupling with the housing unit 100, the control interface gasket 108 provides additional constant pressure on the electronic device 150 and further ensures that the device 150 is fully inserted and coupled in the housing unit 100.

Figure 2:
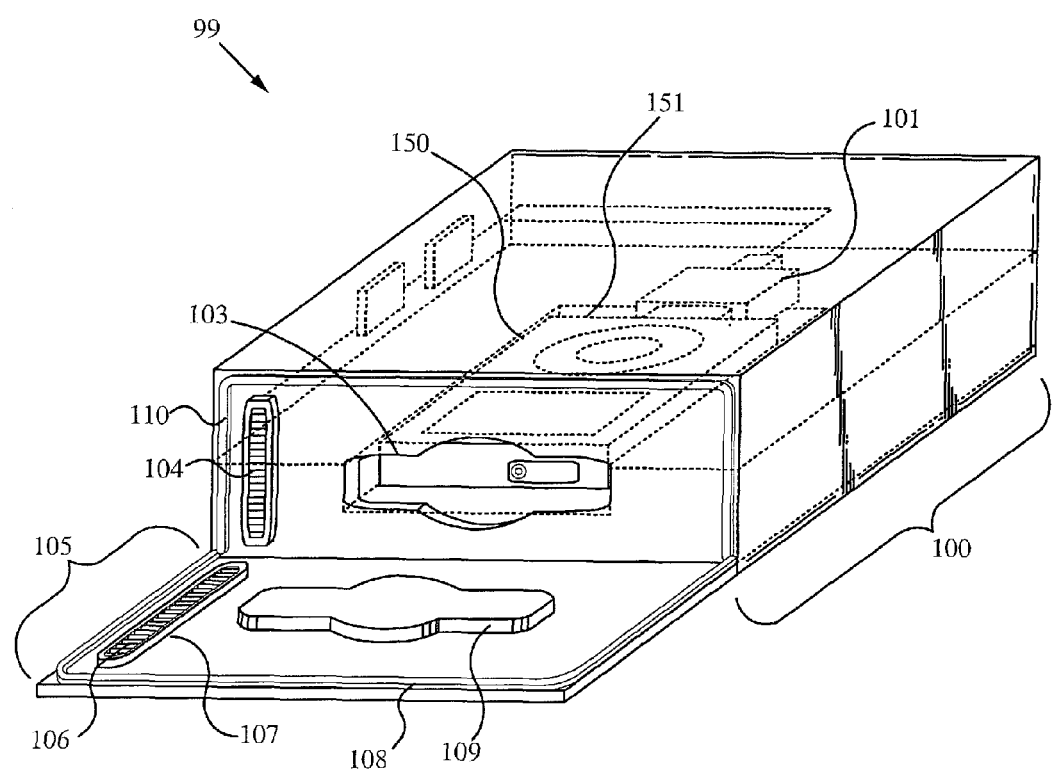
FIG. 2 illustrates a perspective view of a housing unit containing an electronic device according to some embodiments of the present invention.

FIG. 2 illustrates the electronic device 150 positioned within the housing unit 100. As shown, when the electronic device 150 is inserted properly in the form fitting cavity 102, the device connector 151 couples with the device-housing connector 101. When the control interface 105 is closed over the housing unit 100, the cavity interface gasket 109 substantially hermetically seals the electronic device 150 within the cavity 102, the interface connector gasket 107 substantially hermetically seals the interface connector 104 and the controller connector 106 and the control interface gasket 108 substantially hermetically seals the control interface 105 to the housing unit 100.

Figure 3:
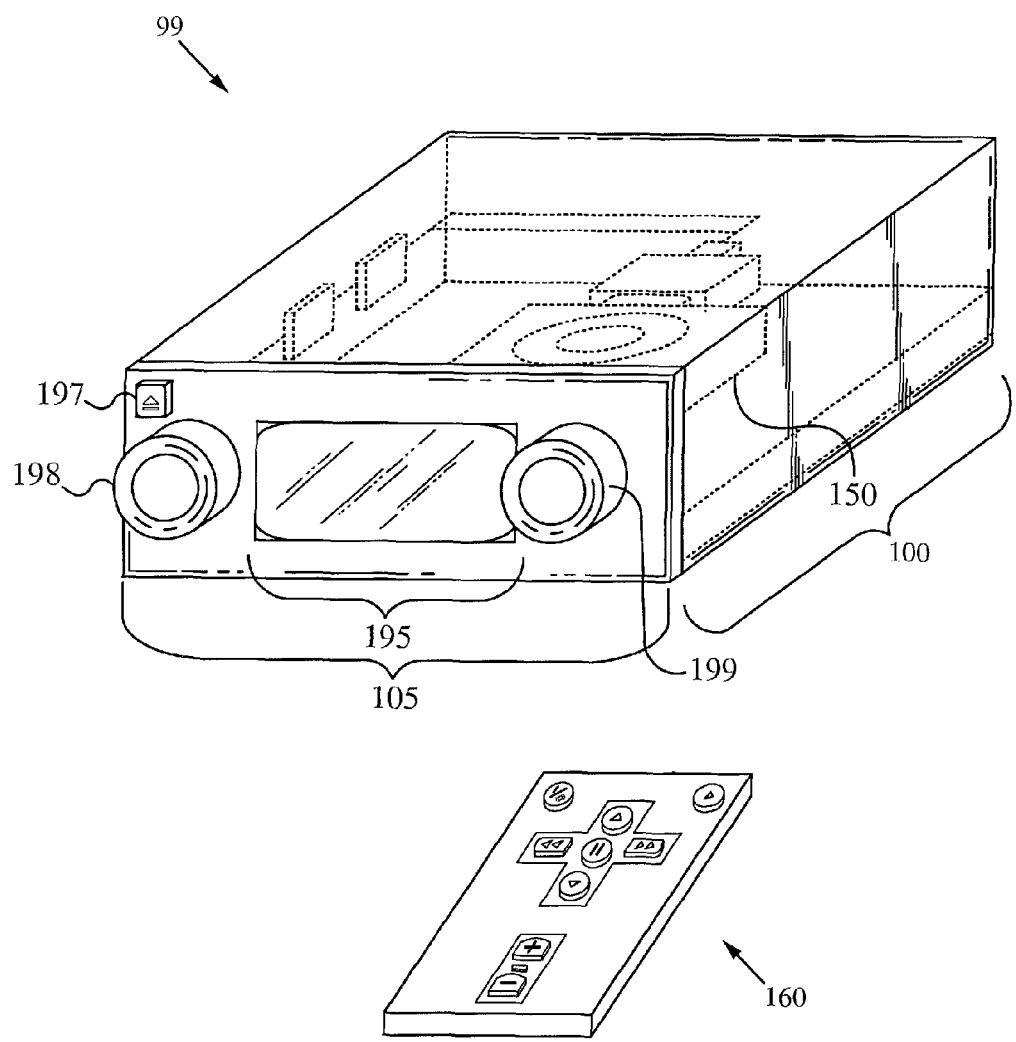
FIG. 3 illustrates a perspective view of a housing unit containing an electronic device with a control interface coupled to the housing unit according to some embodiments of the present invention.

FIG. 3 illustrates the housing unit 100 containing an electronic device 150 with the control interface 105 coupled to the housing unit 100. As shown the control interface 105 has a number of controls 197, 198 and 199. Furthermore, the control interface 105 has a screen 195 for displaying file information from the electronic device 150 as well as video information, if applicable. In some embodiments of the present invention, a remote control 160 is used to control the electronic device 150 when it is housed within the housing unit 100. In some embodiments, an infra red signal is used to transmit and receive information between the remote control 160 and the control interface 105 and the housing unit 100. In an alternative embodiment, the electronic device 150 is controlled by controls on the steering wheel. In alternative embodiments, the electronic device 150 is controlled wirelessly by implementing technologies such as IEEE 802.11, Bluetooth®, Radio Frequency (RF) or any other appropriate wireless methodology.

To connect an electronic device 150 to an audio system in a vehicle via the housing unit 100, the user first moves the controller interface 105 to an open position. The user then inserts the electronic device 150 into the housing unit 100 such that the device connector 151 couples to the corresponding device-housing connector 101 inside the housing unit 100. The user then moves the controller interface 105 to a closed position, forming a waterproof enclosure housing the electronic device 150 within. The controller interface 105 allows the user to operate the electronic device 150, now safely enclosed within the housing unit 100, and play content, such as music or other audio or video, through the vehicle's audio system. Once the electronic device 150 is coupled within the housing unit 100, the user is able to access and control the functions of the electronic device 150 through the control panel.

In alternative embodiments, the electronic device 150 is a portable digital audio player implementing MPEG-1, MPEG-2 and/or MPEG-4 technology, which enables the portable digital audio player to play videos and movies. It will be readily apparent to those having ordinary skill in the art that other video compression formats are able to be implemented in the present invention as well. In yet another alternative embodiment, the electronic device 150 is a portable digital video player and the portable digital video player is coupled to the housing unit 100.

Figure 4A:
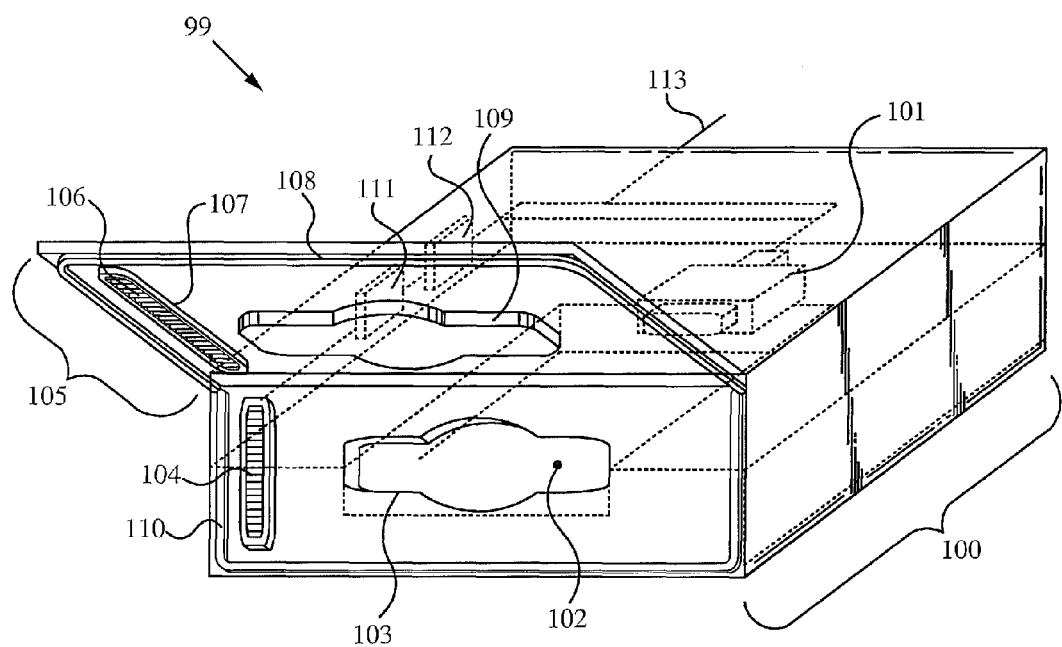
FIG. 4A illustrates a perspective of a housing unit and a flip-down control interface.

As discussed above, the control interface 105 is coupled to the housing unit 100 in a variety of ways according to certain embodiments of the present invention. FIG. 4A illustrates a perspective view of the housing unit 100 and the control interface 105. As shown, the control interface 105 is coupled to the top edge of the housing unit 100 and flips down, wherein the bottom edge of the control interface 105 becomes removably coupled with the bottom edge of the housing unit 100. As the bottom edge of the control interface 105 swings downward and couples with housing unit 100, the control interface 105 defines an enclosure for containing the electronic device 150.

Figure 4B:
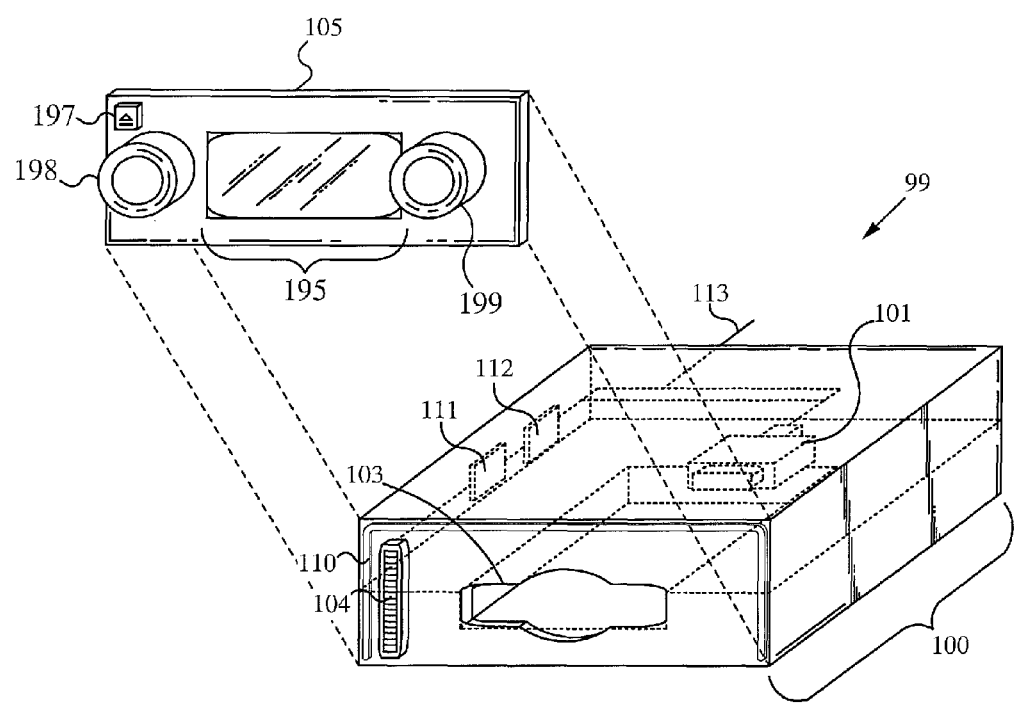
FIG. 4B illustrates a perspective of a housing unit a attachable and detachable control interface.

FIG. 4B illustrates yet another embodiment of the present invention where the control interface 105 is detachably coupled with the housing unit 100. As shown, the control interface 105 is both completely attachable and detachable from the housing unit 100. As such, a user detaches the control interface 105 from the housing unit 100 in order to insert an electronic device (not shown) into the form fitting opening 103. Once the electronic device 150 is completely inserted and coupled within the housing unit 100, the user is able to re-attach the control interface 105 and control the electronic device 150 therein. Once the control interface 105 is coupled to the housing unit 100, such coupling defines an enclosure for containing the electronic device 150 within the housing unit 100. Preferably, the control interface 105 seals the housing unit 100 and defines a waterproof enclosure.

Those skilled in the art will recognize from the context of the descriptions of the embodiments that coupled shall refer to any number of ways to couple. In alternative embodiments, the control interface 105 is coupled to the housing unit 100 via a snap connector, a hinge mount, or a tongue and groove mechanism, among other means. Those skilled in the art will recognize from the context of the descriptions of the embodiments that various means of coupling the control interface 105 to the housing unit 100 define a waterproof enclosure for the containment and protection of the electronic device 150 housed within.

As explained above, the housing unit 100 is part of a vehicle media system according to some embodiments of the present invention. When the user is ready to leave the vehicle, he will move the controller interface 105 to an open position and remove the electronic device 150 from the housing unit 100 by decoupling the device connector 151 from the corresponding device-housing connector 101 inside the housing unit 100. After removing the electronic device 150, the user will then move the controller interface to a closed position. It is another object of some embodiments of the present invention to provide a means for alerting a user that the electronic device 150 is coupled within a housing unit 100. According to these embodiments, the audio system and the housing unit 100 are coupled to the vehicle's engine such that when the engine is turned off and the key removed, a series of beeps will sound to remind the owner that the electronic device 150 is still connected and enclosed within the housing unit 100. This reminder system helps to prevent the owners from leaving the electronic device in the vehicle unintentionally.

FIGS. 1-4B illustrate a housing unit 101 for a specific device 150. Such a design is well-suited for users with a single electronic audio/video device. However, often times users have multiple audio/video devices. Similarly, many consumers choose to frequently purchase new audio/video devices as new features are marketed and old devices become outdated. It is therefore another object of the invention to provide a device housing unit and audio/video player that is able to accommodate a wide variety of electronic devices as well as devices yet to be developed.

Figure 5A:
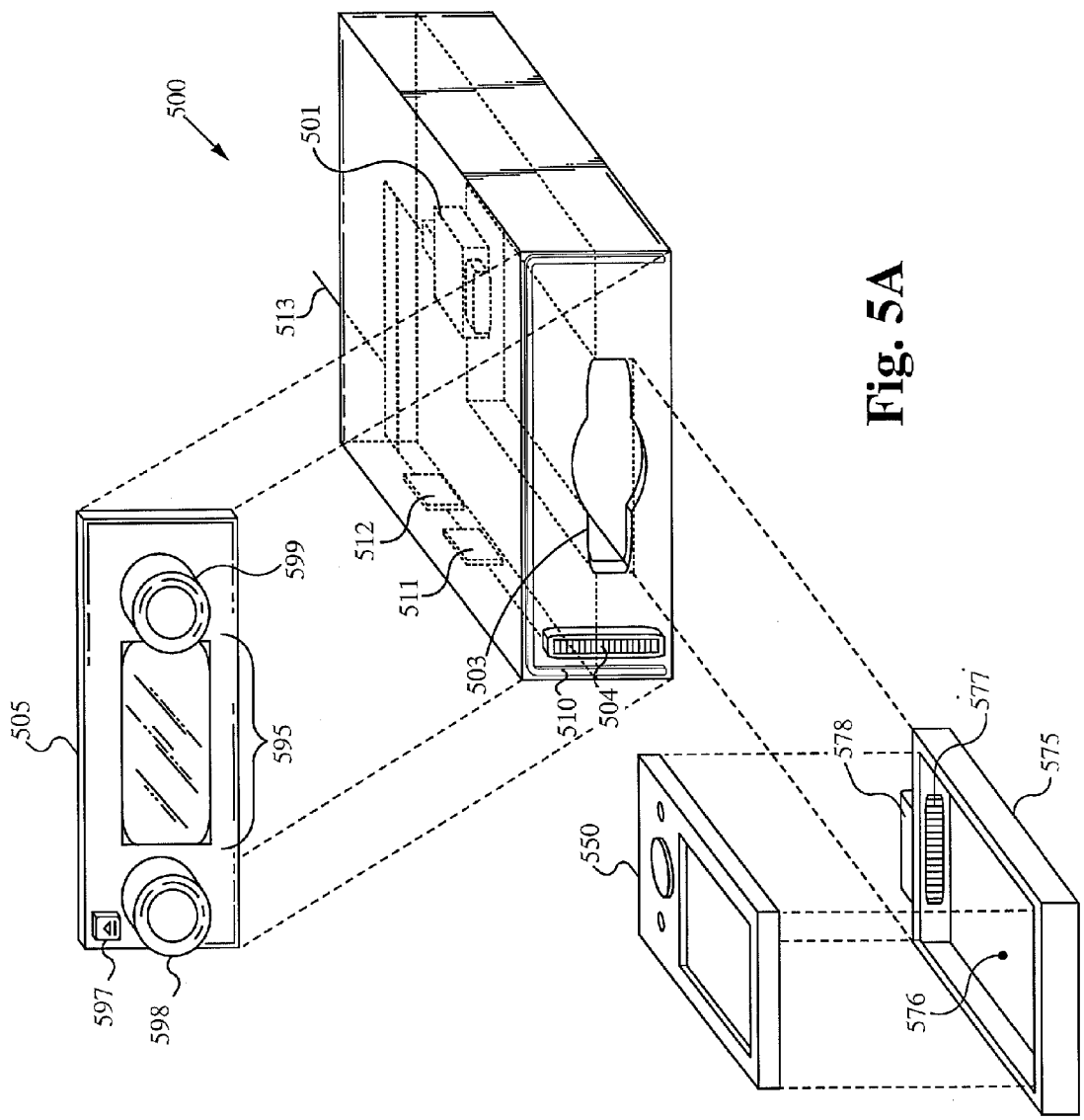
FIG. 5A illustrates a partially exploded view of an alternative design for an electronic device housing unit with control interface utilizing a cartridge according to some embodiments of the present invention.
Figure 5B:
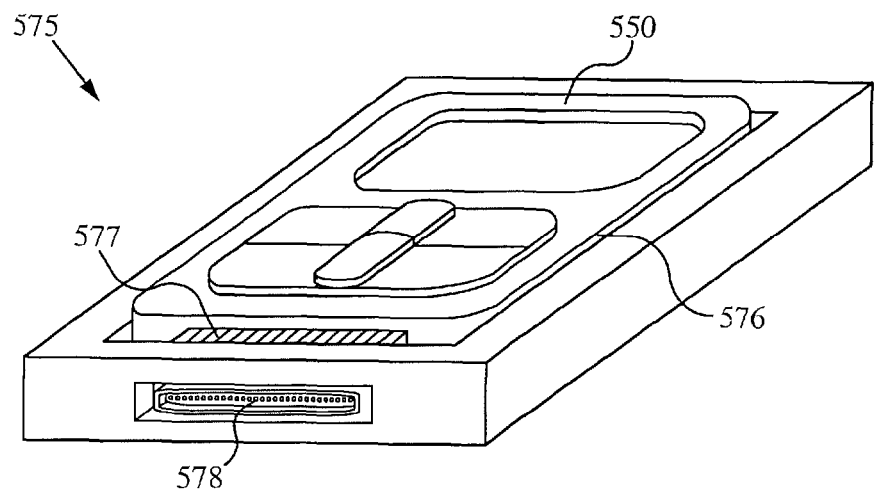
FIG. 5B illustrates a particular cartridge for housing an electronic device according to some embodiments of the present invention.
Figure 5C:
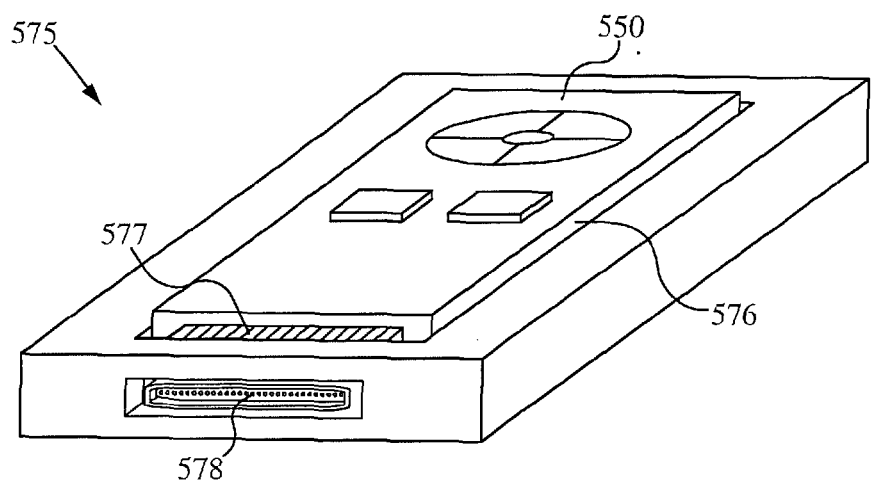
FIG. 5C illustrates another particular cartridge for housing an electronic device according to some embodiments of the present invention.
Figure 5D:
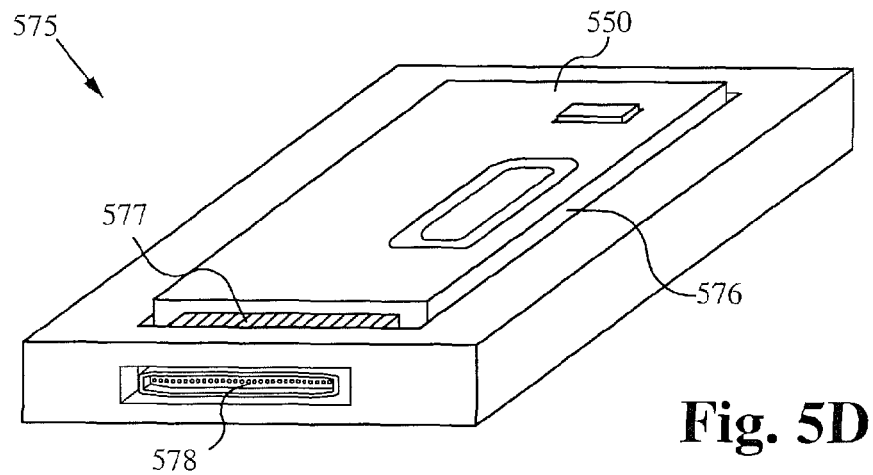
FIG. 5D illustrates another particular cartridge for housing an electronic device according to some embodiments of the present invention.
Figure 5E:
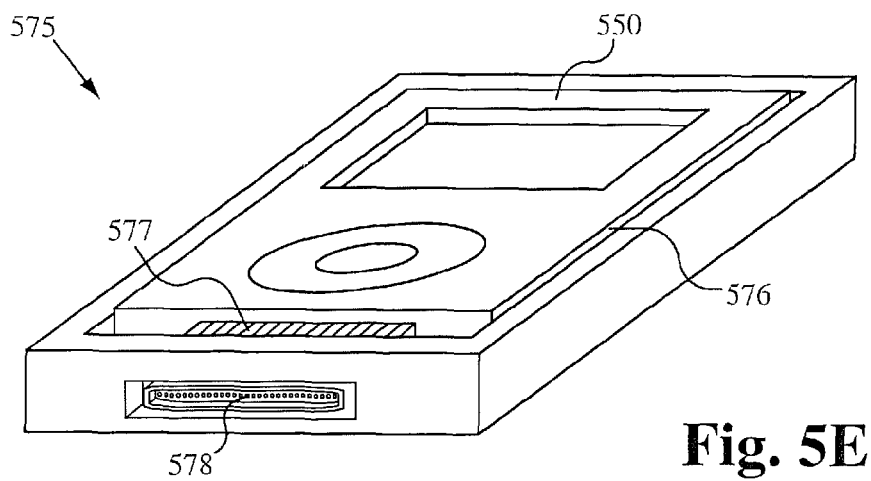
FIG. 5E illustrates another particular cartridge for housing an electronic device according to some embodiments of the present invention.
Figure 5F:
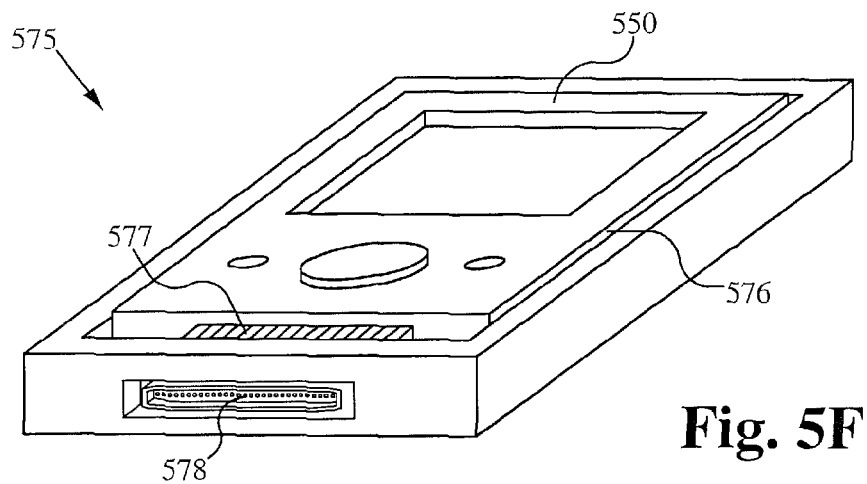
FIG. 5F illustrates another particular cartridge for housing an electronic device according to some embodiments of the present invention.

FIG. 5A illustrates a partially exploded view of an alternative design for an electronic device 550 housing unit 500 with control interface 505 according to some embodiments of the present invention. According to this design, the housing unit 500 is not device specific, meaning that the housing unit 500 accommodates a number of different electronic devices 550. To this end, an additional cartridge 575 is employed to hold a variety of electronic devices 550.

The housing unit 500 comprises an opening 503 which receives the cartridge 575 and an interface connector 504. Furthermore, the housing unit 500 comprises a surface geometry, such as the ridge 510, such that when the control interface 505 is coupled to the housing unit 500, the gasket features (not shown) substantially hermetically seal the control interface 505 with the housing unit 500. The housing unit 500 also comprises an opening 503, a housing-cartridge connector 501 and circuitry 511, 512.

In some embodiments of the present invention, the cartridge 575 comprises a form-fitting cavity 576 to hold an electronic device 550. The cartridge 575 also comprises a device-cartridge connector 577 and a cartridge-housing connector 578. The opening 503 allows access to a cavity 502 which accommodates the cartridge 575 fitted with an electronic device 550. When the cartridge 575 is fully inserted in the cavity 502, the cartridge-housing connector 578 couples with the housing-cartridge connector 501. When the control interface 505 is coupled to the housing unit 500, appropriately placed gaskets (not shown) located on the back of the control interface 505 further ensure the cartridge 575 is fully inserted in the housing unit 500 and that the connectors maintain sufficient contact with each other.

FIGS. 5B-5F illustrate a number of cartridges 575 which are able to be used with the housing unit 500. As shown, each cartridge 575 has a form-fitting cavity 576 which snugly fits a particular electronic device 550. Also, each cartridge has the same outer dimension and has an identical cartridge-housing connecter 578, such that each cartridge may be inserted, connected to and controlled by the housing unit 500. Each device-specific cartridge has a unique geometry such that the connector (not shown) of the device 550 aligns with the device-cartridge connector 577 when the device is placed in the cartridge 575.

Figure 6B:
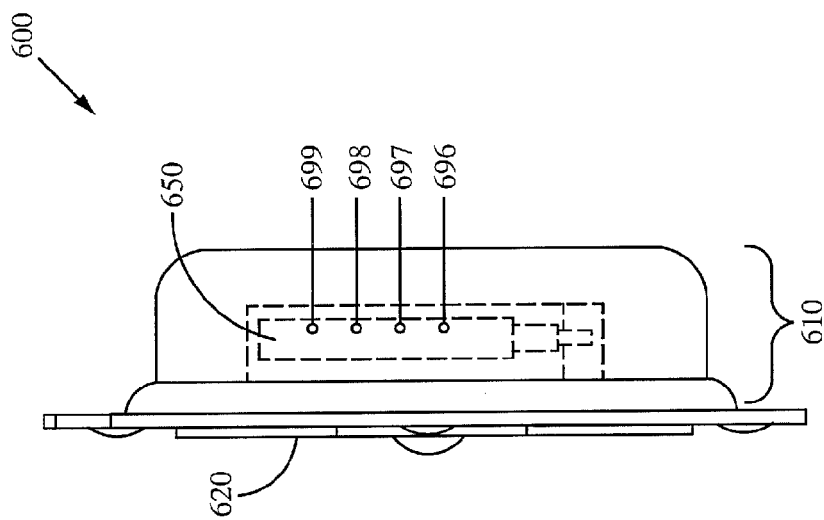
FIG. 6B illustrates a side schematic view of housing unit with an enclosure containing an electronic device and with component outputs according to some embodiments of the present invention.
Figure 6A:
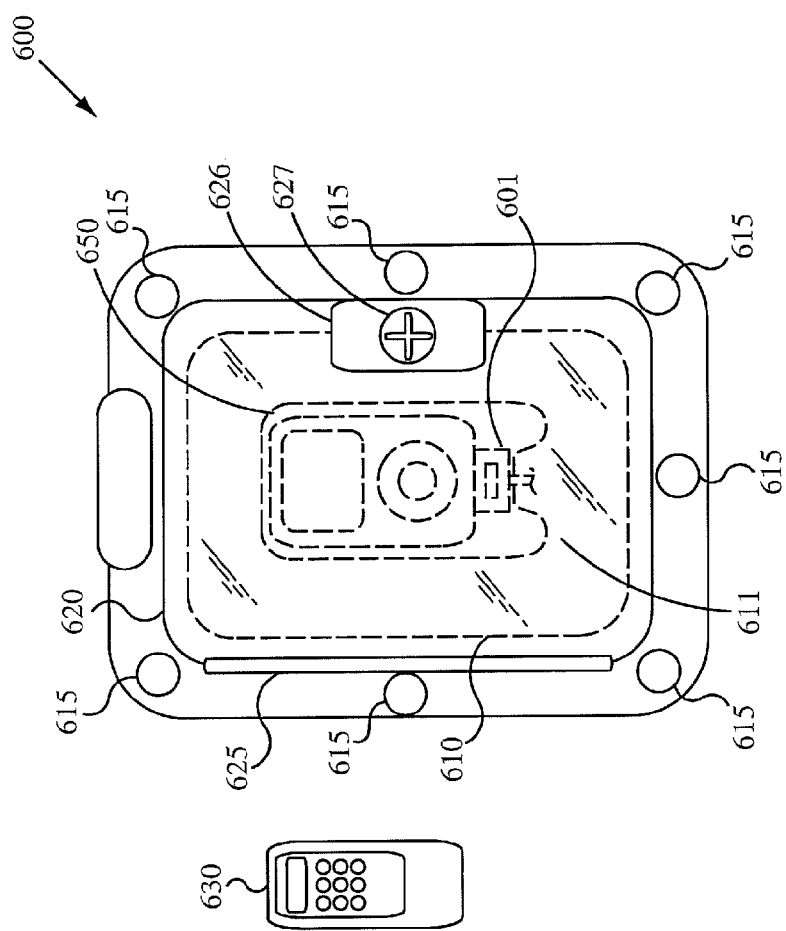
FIG. 6A illustrates a front schematic view of a housing unit with an enclosure containing a remote control controllable electronic device according to some embodiments of the present invention.

FIG. 6A illustrates a schematic front view of an alternative configuration for a media device docking station according to some embodiments of the present invention. FIG. 6A shows a housing unit 600 holding an electronic device 650 (indicated by dashed lines). The housing unit 600 includes an enclosure 610 (indicated by dashed lines) which is sealable by a cover 620. The housing unit 600 is integrated into a vehicle or other product with connectors 615. In some embodiments of the present invention, the enclosure 610 contains a formed fitted recessed area 611 with an unique geometry such that an electronic device 650 fits securely within the recessed area 611.

In some embodiments of the present invention, the enclosure 610 passively holds the electronic device 650 and substantially hermetically seals the electronic device 650 therein. In other embodiments of the present invention, the enclosure 610 contains the necessary circuitry (not shown) to operate the electronic device 650. In some embodiments, the housing unit 600 is coupled to speakers (not shown) for broadcasting music contained within the electronic device 650 or coupled to a display screen (not shown) for displaying picture or video files contained on the electronic device 650.

The electronic device 650 includes an electronic device connector (not shown) used to couple with the necessary circuitry to play the electronic device 650. A device-housing connector 601 (indicated by dashed lines) couples with the electronic device connector. The device-housing connector 601 electronically couples the electronic device 650 with the rest of the circuitry (not shown) needed to play the electronic device 650. As shown, the device-housing connector 601 is the male end of the connector and the electronic device 650 has a connector which is the female counterpart to the device-housing connector 601. It will be readily apparent to those ordinarily skilled in the art that in alternative embodiments, the device connector is the male end of a connector pairing and that the device-housing connector 601 is the female end of the connector pairing. It will also be apparent to those having ordinary skill in the art, that although the connectors are shown having a particular geometry and pin layout, any connectors which electrically couple the device 650 with the housing 610 are equally envisioned. In some embodiments of the present invention the electronic coupling means are selected from among: RCA cables, multi-pin connectors, 8P8C connectors, DE-9 connectors, USB connectors, and 30-pin connectors, among others.

The housing unit 600 encloses the electronic device 650 within the enclosure 610 with a cover 620. The cover 620 rotates on a hinge 625. In some embodiments of the present invention, the cover 620 also includes a kick plate 626 and a handle 627 to access the cover 620. In some embodiments of the present invention, the cover 620 substantially hermetically seals the enclosure 610 when in the closed position. As such, the electronic device 650 is able to be used in wet conditions and environments which would normally put the device 650 at risk of failure or shorts.

In some embodiments of the present invention, a remote control 630 is used to interface with the electronic device 650. In some embodiments, the remote control 630 is a RF remote control, however other types of remote controls are equally envisioned. In some embodiments of the present invention, the cover 620 comprises a clear surface. According to these embodiments, a remote control 630 may be used to interface with the electronic device 650 while the electronic device 650 is enclosed behind the clear surface cover 620.

FIG. 6B illustrates a side view of the housing unit 600. As shown, the cover 620 seals an electronic device 650 (indicated by dashed lines) within an enclosure 610. The electronic device 650 is coupled to the appropriate circuitry (not shown) and a number of peripheral connections 699, 698, 697, and 696 are located on the side of the housing unit 600. In some embodiments of the present invention the peripheral connections 699, 698, 697, and 696 comprise audio and video outputs.

Figure 7:
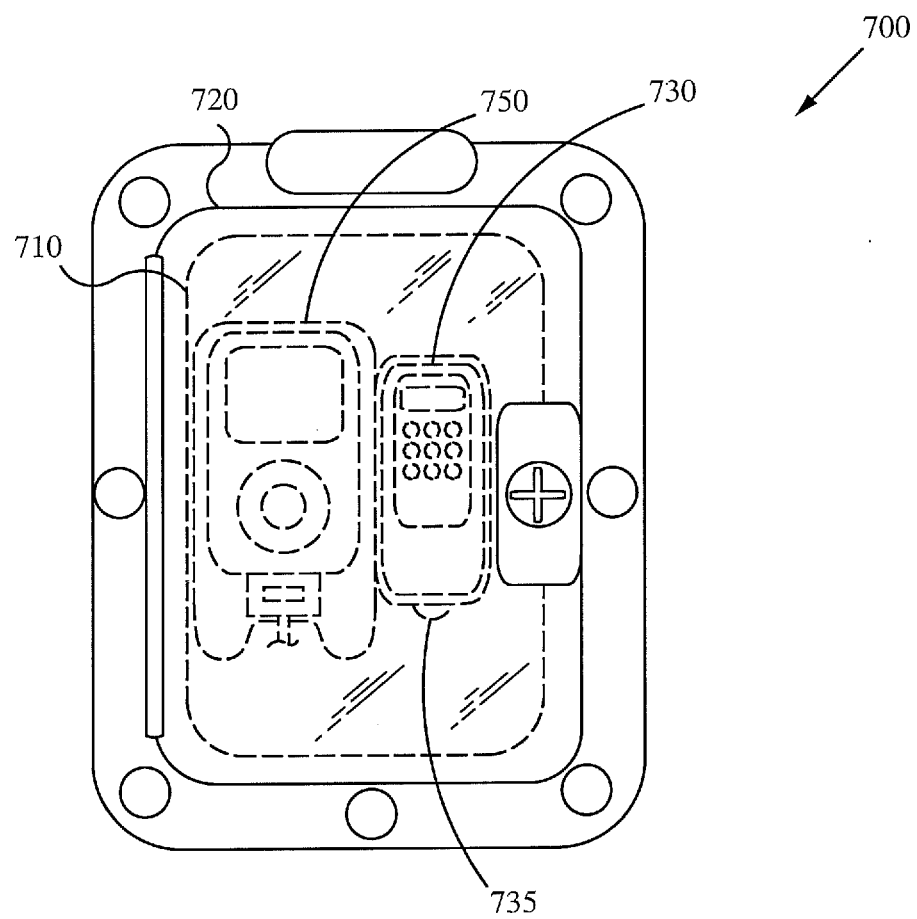
FIG. 7 illustrates a front schematic view of an alternative housing unit with an enclosure containing an electronic device and remote control according to some embodiments of the present invention.

FIG. 7 illustrates a schematic front view of an alternative configuration for the housing unit 700, wherein the housing unit contains an electronic device 750 and a remote control 730 housed within and substantially hermetically sealed by the cover 720. According to this embodiments, the enclosure 710 contains a remote control dock 735 (indicated by dashed lines), and the remote control 730 is configured to fit securely within the remote control dock 735. In some embodiments of the present invention, the remote control dock 735 comprises a recharging dock to recharge the remote control 730.

Figure 8:
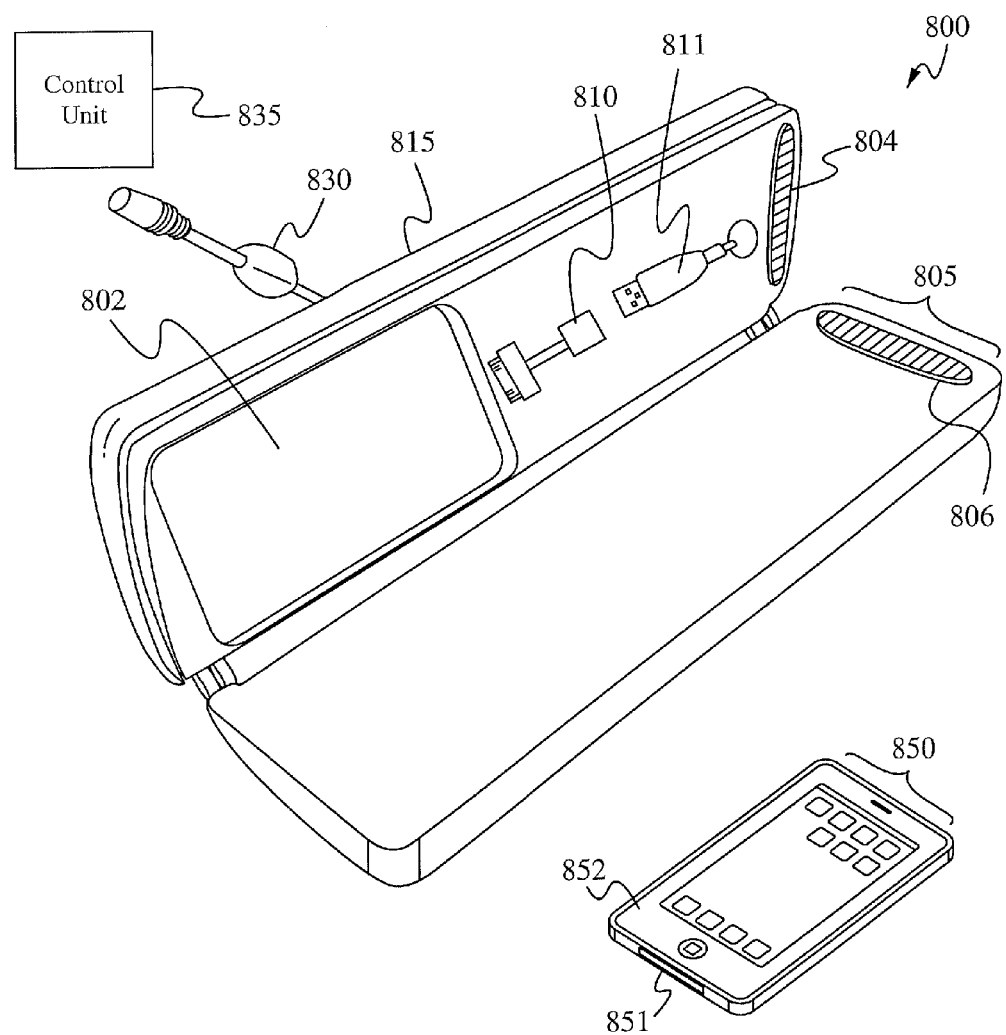
FIG. 8 illustrates a perspective view of an electronic device and housing unit according to some embodiments of the present invention.

FIG. 8 illustrates a perspective view of an electronic device 850 and a housing unit 800 with a form fitting cavity 802 and device-housing connector 811 for electronically coupling the electronic device 850 with the housing unit 800. In some embodiments, the housing unit 800 comprises a connector 830 which connects the housing unit 800 and the electronic device 850 with the components of an existing audio system 835. For example, in some embodiments, the connector 830 connects the housing unit 800 and the electronic device 850 with an amplifier and/or speakers of an audio system 835. In some embodiments, the housing unit comprises a device-housing adapter 810 which connect the electronic device with the device-housing connector 811 and the housing unit 800. The device-housing adapter 810 enables the housing unit 800 to interchangeably connect with different electronic devices through the device-housing connector 811. In some embodiments of the present invention, the electronic device 150 is a portable digital media device such as an iPod™, Palm™, Zen™, Zune™, or other digital media devices, MP3 players and music phones. In other embodiments of the present invention, the electronic device 850 supports MP4 format or DivX Media Format devices. Additionally, in some embodiments, the electronic device supports satellite radio and/or AM/FM radio. Alternatively, the electronic device 850 supports any appropriate audio or video recording and transmission format. Particularly, the electronic device 850 is able to support any combination of the above data formats.

To couple the electronic device 850 with the housing unit 800, the electronic device is inserted into the form fitting cavity 802. In some embodiments, the form fitting cavity 802 is designed to firmly accommodate a particular electronic device 850. Accordingly, in some embodiments, the electronic device 850 is press fit into the form fitting cavity 802 and held in place by pressure of the form fitting cavity 802 on the electronic device. In some embodiments, the form fitting cavity 802 is generically sized to fit a variety of electronic devices. In some embodiments, the electronic device 850 is placed into the form fitting cavity 802 by placing the back of the electronic device 850 against the back of the form fitting cavity 802. In this configuration, the depth of the form fitting cavity 802 with the electronic device is substantially equal to the width of the electronic device. In some embodiments, when the electronic device is placed within the form fitting cavity 802, the front face 852 faces outward from the form fitting cavity 802.

The device-housing connector 811 couples with the device-housing adapter 810 and the electronic device connector 851 to couple the electronic device 850 to the housing unit 800. As described above, it will be apparent to those having ordinary skill in the art, that although the connectors 811, 810 and 851 are shown having a particular geometry and pin layout, any connectors which electrically couple the electronic device 850 with the housing 800 are equally envisioned. In some embodiments, the electronic coupling means are selected from among: RCA cables, multi-pin connectors, 8P8C connectors, DE-9 connectors, USB connectors, and 30-pin connectors, among others.

The cover 805 is coupled to the housing unit 800. As shown, the controller interface 805 is attached to the bottom edge of the housing unit 800 and the cover 805 swings upward to couple with the top edge of the housing unit 800 to define an enclosure for containing the electronic device 850 within the housing device 800. It will be readily apparent to those ordinarily skilled in the art that the cover 805 is able to couple to the housing unit in a wide variety of ways, including, but not limited to, flip down designs and detachable designs.

In some embodiments, the cover 805 comprises a controller interface which is electronically coupled to the housing unit 800 through the interface connector 804 and the controller connector 806. A user interfaces the controller interface via controls (not shown) on the face of the controller interface 805. In some embodiments, the interface connector 804 is further coupled to circuitry of the housing unit 800, including the device-housing connector 810 and the connector 830. In some embodiments, the connection between the housing 800 and the controller interface 805 is substantially hermetic. Accordingly, in some embodiments, the controller interface 805 comprises a number of sealing gaskets to hermetically couple the housing 800 and controller interface 805, such as described above.

Figure 9:
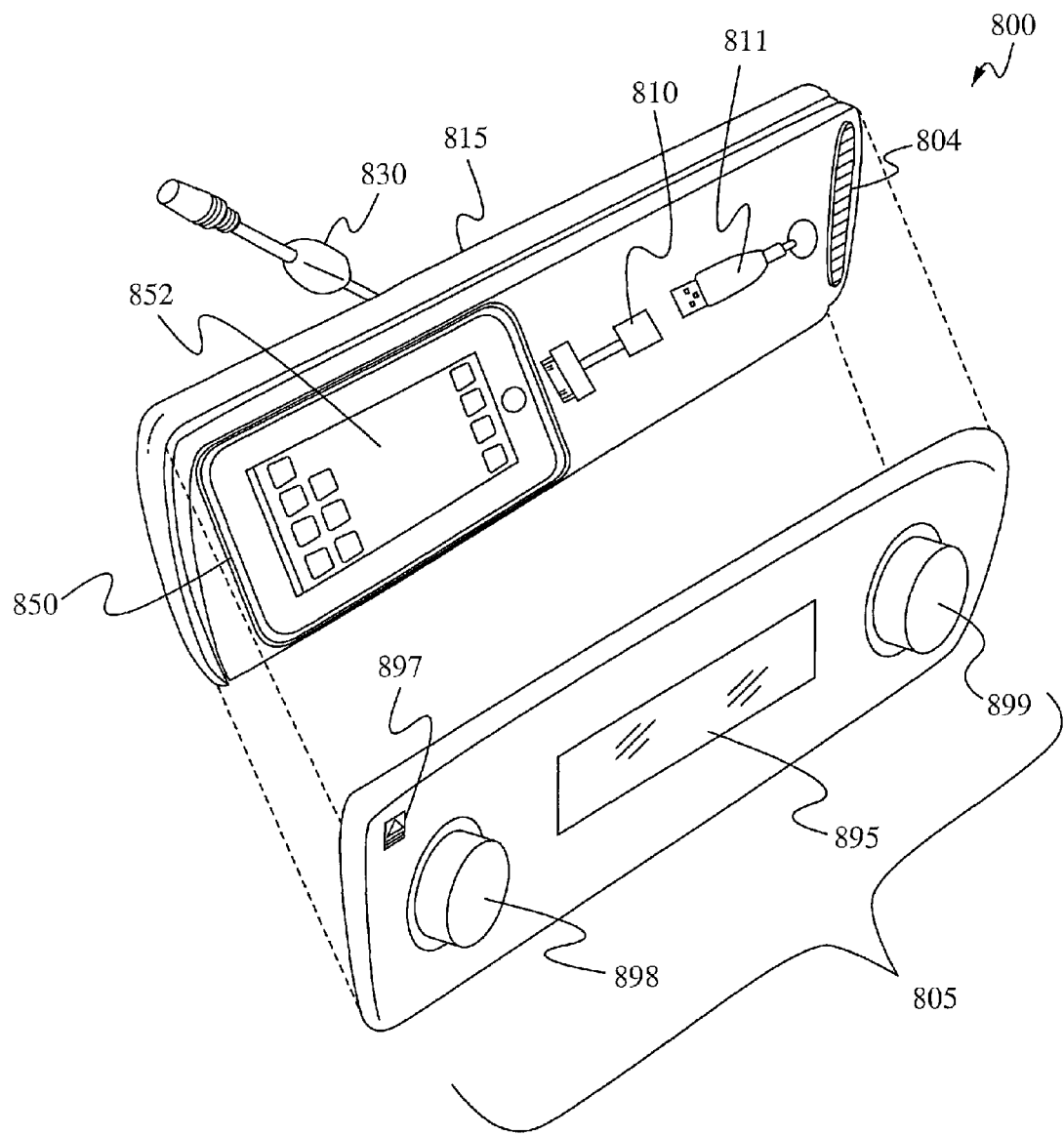
FIG. 9 illustrates a perspective of a housing unit and attachable and detachable control interface.

FIG. 9 illustrates the electronic device 850 positioned within the housing unit 800. When the electronic device 850 is inserted properly into the form fitting cavity 802, the device connector couples with the device-housing adapter and the device-housing connector. As shown, the front face 852 of the electronic device 850 faces outward when the electronic device 850 is placed within the cavity 802. Additionally, as shown, the controller interface 805 is both completely attachable and detachable from the housing unit 800. As such, a user detaches the controller interface 805 from the housing unit 800 in order to insert an electronic device 805 into the form fitting opening 802. Once the electronic device 850 is completely inserted and coupled within the housing unit 800, the user is able to re-attach the controller interface 805 and control the electronic device 850 therein. Once the controller interface 805 is coupled to the housing unit 800, such coupling defines an enclosure for containing the electronic device 850 within the housing unit 100. In some embodiments, the controller interface 805 seals the housing unit 800 and defines a waterproof enclosure.

As shown the controller interface 805 has a number of controls 897, 898 and 899. Furthermore, the controller interface 805 has a screen 895 for displaying file information from the electronic device 850 as well as video information, if applicable. In some embodiments of the present invention, a remote control (not shown) is used to control the electronic device 850 when it is housed within the housing unit 800. In some embodiments, an infra red signal is used to transmit and receive information between the remote control and the controller interface 105 and the housing unit 800. In an alternative embodiment, the electronic device 850 is controlled by controls on the steering wheel. In alternative embodiments, the electronic device 850 is controlled wirelessly by implementing technologies such as IEEE 802.11, Bluetooth®, Radio Frequency (RF) or any other appropriate wireless methodology.

Figure 10:
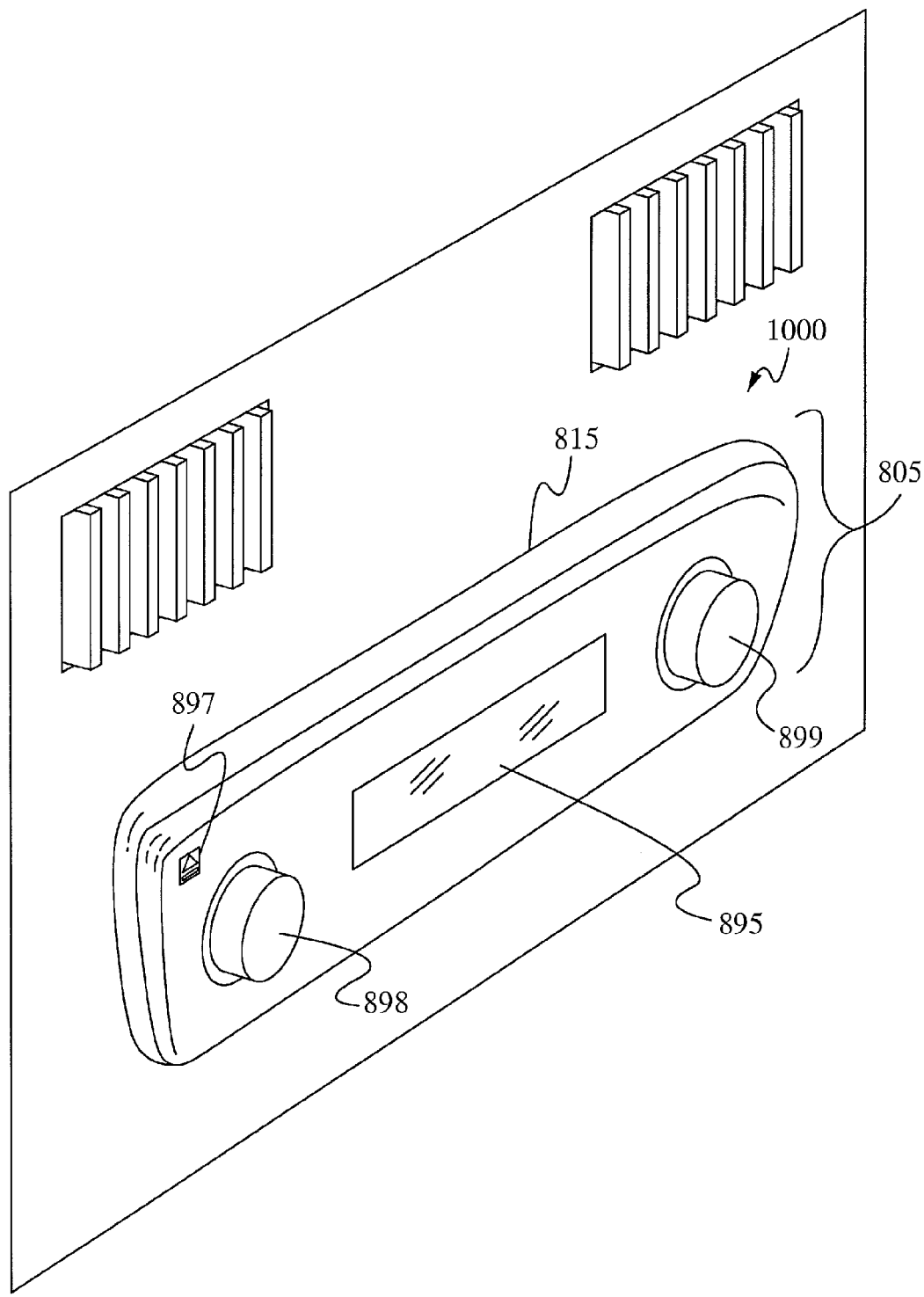
FIG. 10 illustrates a perspective view of a housing unit mounted to a surface according to some embodiments of the present invention.

FIG. 10 illustrates the housing unit 800 mounted to a surface 1000. As shown in FIG. 10, a back 815 of the housing unit 800 is mounted flush to the surface 1000. As shown the housing unit 800 is mounted to the surface 1000 in a manner in which the back 815 of the housing unit 800 does not protrude into or through the surface 1000. The housing unit 800 is mounted such that all of the housing unit 1000 is on the same side of the surface 1000. Particularly, because the electronic device 850 is inserted into the housing unit 800 so that the front face of electronic device 850 faces the back of the controller interface 805 when the controller interface 805 is in a closed position the housing unit 800 is able to be mounted with the back of housing 800 unit flush to mounting surface 1000. In some embodiments, the housing unit 800 is mounted to the surface 1000 by one or more of threaded screws, rivets, glue and brackets. However, the housing unit 800 is able to be mounted to the surface 1000 by any mechanism as known in the art. In some embodiments, the housing unit 800 is removably mounted to the surface 1000.

As described above, to connect an electronic device 850 to the housing unit 800, the user first moves the controller interface 805 to an open position. The user then inserts the electronic device 850 into the housing unit 800 such that the device connector 851 couples with the device-housing adapter 810 and the device-housing connector 811 inside the housing unit 800. The user then moves the controller interface 805 to a closed position. As further described above, the electronic device 850 is inserted into a cavity of the housing unit 800 by placing a back of the electronic device 850 against a back of the cavity so that the front face 852 of electronic device 850 faces the back of the controller interface 805 when the controller interface is in a closed position. In some embodiments, when the controller interface is moved to a closed position, a waterproof enclosure is formed housing the electronic device 850 within.

As described above, the controller interface 805 allows the user to operate the electronic device 850, now safely enclosed within the housing unit 800, and play content, such as music or other audio or video, through the vehicle's audio and video system. The housing unit 800 enables a user to amplify and control the features of the electronic device 850 through an existing audio and/or video system. Additionally, due to the size and configuration of the housing unit 800 a user is able to mount the housing unit 800 so that a back of the housing unit is flat against and flush with a surface. Accordingly, the housing unit 800 is able to be mounted in numerous places where a traditional audio and video system cannot be mounted, such as thin surfaces without the extra space for the chassis of a traditional audio video system. Accordingly, the notification system has many advantages.

The present invention provides an easy and convenient way to play a portable electronic device in an audio system. The present invention does not require coupling through a tape player or via radio waves as does the two main options for connecting a portable digital media player to an audio system in the prior art. Furthermore the electronic device is substantially hermetically sealed within the audio system such that a user is able to control the device in a wet and dusty environment without fear of damaging the audio system or the electronic device. Accordingly, the presently claimed invention provides an easy and convenient way to play a portable electronic device while operating a vehicle that is exposed to dust and water such as a car, a camper, a boat, a jet ski, wave runner, golf cart, tractor, street sweeper and other vehicles and equipment. However as will be evident to someone of ordinary skill in the art, the Docking Station for an Electronic Device described herein is able to be implemented with any vehicle or structure where the use of a digital media player is desired.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device and method of the present invention could be implemented in several different ways and have several different appearances.

What is claimed is:

1. A mountable housing for removably holding an electronic device, comprising:
   a. a cavity to accept the electronic device;
   b. a connector located within the cavity to couple with the electronic device; and
   c. a front cover movable between an open position and a closed position and coupled to the apparatus, wherein the electronic device is inserted into or removed from the cavity when the front cover is in the open position;
   wherein when the front cover is in the closed position and the electronic device is in the cavity a front face of the electronic device faces a back of the front cover and further wherein when the front cover is in the closed position, the cover seals the cavity to be waterproof.

2. The mountable housing for removably holding an electronic device of claim 1, wherein the cover comprises a controller interface, wherein the controller interface couples to the housing unit to define the sealed enclosure, and wherein the controller interface comprises a user interface for controlling the electronic device when the electronic device is housed in the housing unit.

3. The mountable housing for removably holding an electronic device of claim 1, wherein the housing is mounted on a flat surface.

4. The mountable housing for removably holding an electronic device of claim 3, wherein the housing is removably mounted to the flat surface.

5. The mountable housing for removably holding an electronic device of claim 1, further comprising a connector which connects to one or more of an amplifier and speakers.

6. The mountable housing for removably holding an electronic device of claim 1, wherein the cavity is an electronic device specific form-fitting opening.

7. The mountable housing for removably holding an electronic device of claim 1, wherein the opening is an electronic device generic opening, wherein the opening accommodates a number of different sized electronic devices, and wherein the enclosure is an electronic device generic enclosure which accommodates a number of different sized electronic devices.

8. The mountable housing for removably holding an electronic device of claim 1, wherein the connector is selected from among RCA cables, multi-pin connectors, 8P8C connectors, DE-9 connectors, USB connectors, and 30-pin connectors.

9. The mountable housing for removably holding an electronic device of claim 1, wherein the apparatus further comprises:
   a receiver for receiving wireless transmissions; and
   a wireless remote with a transceiver, wherein the transceiver sends wireless information to the receiver, and wherein the wireless information controls the electronic device contained within the housing unit.

10. The mountable housing for removably holding an electronic device of claim 9, wherein the receiver and transceiver utilize wireless transmission technologies selected from among IEEE 802.11 standard wireless technology, Bluetooth® wireless technology, Infra-red transmission technology, and Radio Frequency technology.

11. The mountable housing for removably holding an electronic device of claim 9, wherein the cover is configured to allow the transmission of wireless transmission technologies therethrough.

12. The mountable housing for removably holding an electronic device of claim 2, wherein the controller interface comprises controls coupled to a steering mechanism.

13. The mountable housing for removably holding an electronic device of claim 2, the controller interface further comprising a display screen.

14. The mountable housing for removably holding an electronic device of claim 13, wherein the display screen displays video files selected from among DivX Media, MPEG-1, MPEG-2 and MPEG-4 video files.

15. The mountable housing for removably holding an electronic device of claim 2, wherein the controller interface detachably couples with the housing.

16. An apparatus for housing and controlling a removable electronic device, comprising:
   a. a housing unit comprising:
      i. an enclosure for holding the electronic device;
      ii. a connector for coupling with the electronic device; and
      iii. a cover movable between an open position and a closed position and coupled to the apparatus, wherein the electronic device is inserted into or removed from the enclosure when the front cover is in the open position, and further wherein when the cover is in a closed position, the cover seals the enclosure to be waterproof;
   wherein a back of the housing unit is mounted flush with an exterior surface.

17. The apparatus for housing and controlling a removable electronic device of claim 16, wherein the cover comprises a user interface for controlling the electronic device when the electronic device is housed in the housing unit.

18. The apparatus for housing and controlling a removable electronic device of claim 16, wherein the apparatus removably mounts to the mountable surface.

19. The apparatus for housing and controlling a removable electronic device of claim 16, further comprising a connector which connects to one or more of an amplifier and speakers.

20. The apparatus for housing and controlling a removable electronic device according to claim 16, wherein the enclosure is an electronic device specific form-fitting enclosure.

21. The apparatus for housing and controlling a removable electronic device of claim 16, wherein the enclosure accommodates a number of different sized electronic devices.

22. The apparatus for housing and controlling a removable electronic device of claim 16, wherein the connector is selected from among RCA cables, multi-pin connectors, 8P8C connectors, DE-9 connectors, USB connectors, and 30-pin connectors.

23. The apparatus for housing and controlling a removable electronic device of claim 16, wherein the user interface further comprises:
   a receiver for receiving wireless transmissions; and
   a wireless remote control device with a transceiver, wherein the transceiver sends wireless information to the receiver to control the electronic device contained within the housing unit.

24. The apparatus for housing and controlling a removable electronic device of claim 16, wherein the receiver and transceiver utilize wireless transmission technologies selected from among IEEE 802.11 standard wireless technology, Bluetooth® wireless technology, Infra-red transmission technology, and Radio Frequency technology.

25. The apparatus for housing and controlling a removable electronic device of claim 16, wherein the user interface comprises controls coupled to a steering mechanism.

26. The apparatus for housing and controlling a removable electronic device of claim 17, wherein the user interface further comprises a display screen.

27. The apparatus for housing and controlling a removable electronic device of claim 26, wherein the display screen displays video files selected from among DivX Media, MPEG-1, MPEG-2 and MPEG-4 video files.

28. The apparatus for housing and controlling a removable electronic device of claim 17, wherein the user interface detachably couples from the housing unit.

29. A method of coupling a removable electronic device to an audio apparatus, comprising:
   coupling a removable electronic device within a housing unit, wherein a back of the electronic device is placed flat against a back of the housing unit and a front cover is closed over a front of the electronic device thereby defining a sealed waterproof enclosure, wherein the electronic device is inserted into or removed from the housing unit when the front cover is in an open position; and
   controlling the electronic device from outside the housing unit when the electronic device is sealed within the housing unit.

30. The method of coupling a removable electronic device to an audio apparatus of claim 29, further comprising coupling a user interface to the housing unit.

31. The method of coupling a removable electronic device to an audio apparatus of claim 29, further comprising broadcasting signals from a remote control having a transceiver to the user interface, wherein the user interface is configured with a receiver for receiving wirelessly broadcasted signals.

32. The method of coupling a removable electronic device to an audio apparatus of claim 29, wherein the user interface is coupled to steering controls, and wherein the steering wheel controls are used to control the electronic device when the electronic device is sealed within the housing unit.

33. The method of coupling a removable electronic device to an audio apparatus of claim 29, further comprising:
   displaying video content from the electronic device on a display screen.

34. An apparatus for housing and controlling a removable electronic media player comprising:
   a. a housing unit comprising:
      i. a sealable waterproof enclosure configured to house a removable electronic media player;
      ii. an opening configured to accept the electronic media player;
      iii. a connector located within the sealable enclosure for coupling with the electronic media player; and
   b. a cover for covering the opening and comprising a control interface for controlling the electronic media player while it is housed within the apparatus,
   wherein the electronic media player is inserted through the opening when the cover is in an open position and into the sealable waterproof enclosure in order to couple with the connector.

35. The apparatus of claim 34 wherein the cover rotates from a closed position to an open position in order to insert the electronic media player through the opening to couple with the connector.

36. The apparatus of claim 34 wherein the cover is completely removed in order to insert the electronic media player through the opening to couple with the connector.

37. The apparatus of claim 34 wherein the electronic media player is controlled by a user interface coupled to the housing unit.

38. The apparatus of claim 37 wherein the user interface is located on the cover.

39. The apparatus of claim 37 wherein the interface is located on a surface of the housing unit.

40. The apparatus of claim 34 wherein the electronic media player is controlled by a remote control.

41. The apparatus of claim 34 wherein the electronic media player sits in a vertical orientation when it is coupled with the connector.

42. The apparatus of claim 34 wherein the electronic media player sits in a horizontal orientation when it is coupled with the connector.

43. The apparatus of claim 34 further comprising an accessory connector which connects to one or more of an amplifier and speakers.

44. The apparatus of claim 34 wherein the enclosure is an electronic media player specific form-fitting opening.

45. The apparatus of claim 34 wherein the opening accommodates a number of different sized electronic devices, and wherein the enclosure accommodates a number of different sized electronic devices.

46. The apparatus of claim 34 wherein the removable electronic media player is selected from the group consisting of a portable music player, Mp3 player, music telephone, Mp4 player, or DivX Media format player.

47. A system for housing and controlling a removable electronic media player comprising:
   a. a housing unit comprising:
      i. a sealable waterproof enclosure configured to house a removable electronic media player;
      ii. an opening configured to accept the electronic media player;
      iii. a connector located within the sealable enclosure for coupling with the electronic media player;

b. a separately movable cover that is movable in order to allow access to the opening, wherein the electronic media player is inserted into or removed through the opening when the separately movable cover is in an open position and further wherein the separately movable cover comprises a control interface for controlling the electronic media player while it is coupled within the housing; and c. an accessory connector which connects to one or more of an amplifier and speakers.

48. The system of claim 47 wherein the cover is moved to an open position by rotating the cover about an edge of the housing unit.

49. The system of claim 47 wherein the cover is removed from the housing unit in order to access the opening.

50. The system of claim 47 wherein the electronic media player is controlled by a user interface coupled to the housing unit.

51. The system of claim 50 wherein the user interface is located on the cover.

52. The system of claim 50 wherein the user interface is located on a surface of the housing unit.

53. The system of claim 47 wherein the electronic media player is controlled by a remote control.

54. The system of claim 47 wherein the electronic media player sits in a vertical orientation when it is coupled with the connector.

55. The system of claim 47 wherein the electronic media player sits in a horizontal orientation when it is coupled with the connector.

56. The system of claim 47 further comprising a connector which connects to one or more of an amplifier and speakers.

57. The system of claim 47 wherein the enclosure is an electronic media player specific form-fitting opening.

58. The system of claim 47 wherein the opening accommodates a number of different sized electronic devices, and wherein the enclosure accommodates a number of different sized electronic devices.

59. The system of claim 47 wherein the removable electronic media player is selected from the group consisting of a portable music player, Mp3 player, music telephone, Mp4 player, or DivX Media format player.

60. A method of removably coupling an electronic media player with a housing for controlling and playing the electronic media player comprising:
   a. inserting the electronic media player through an opening and into a sealable waterproof enclosure of the housing;
   b. coupling the electronic media player with a connector located within the sealable waterproof enclosure; and
   c. closing the opening of the sealable enclosure
   wherein the electronic media player is able to be played once it is coupled within the sealable waterproof enclosure.

61. The method of claim 60 wherein closing the opening of the sealable enclosure comprises rotating a cover in a downward direction or an upward direction and over the opening.

62. The method of claim 60 wherein closing the opening of the sealable enclosure comprises removably coupling the cover with the housing and over the opening.

63. The method of claim 60 wherein the removable electronic media player is selected from the group consisting of a portable music player, Mp3 player, music telephone, Mp4 player, or DivX Media format player.

64. The method of claim 60 further comprising controlling the electronic media player with a user interface coupled to the housing unit.

65. The method of claim 64 wherein the user interface is located on the cover.

66. The method of claim 64 wherein the user interface is located on a surface of the housing unit.

67. The method of claim 60 further comprising controlling the electronic media player with a remote control.

68. A mountable housing for removably holding an electronic device, comprising:
   d. a cavity to accept the electronic device;
   e. a connector located within the cavity to couple with the electronic device; and
   f. a front cover coupled to the apparatus;
wherein when the front cover is in a closed position and the electronic device is in the cavity a face of the electronic device faces a back of the front cover and further wherein when the front cover is in the closed position, the cover seals the cavity to be waterproof, wherein the electronic device is inserted into or removed from the cavity when the front cover is in the open position.

* * * * *